United States Patent [19]

Brown

[11] Patent Number: 5,727,208
[45] Date of Patent: Mar. 10, 1998

[54] METHOD AND APPARATUS FOR CONFIGURATION OF PROCESSOR OPERATING PARAMETERS

[75] Inventor: Alan E. Brown, Georgetown, Tex.

[73] Assignee: Dell U.S.A. L.P., Austin, Tex.

[21] Appl. No.: 497,955

[22] Filed: Jul. 3, 1995

[51] Int. Cl.$^6$ .................................................. G06F 15/20
[52] U.S. Cl. ........................................... 395/653; 395/651
[58] Field of Search ................................ 395/750, 800, 395/183.12, 182.13, 182.22, 653, 651

[56] References Cited

U.S. PATENT DOCUMENTS

| | | | |
|---|---|---|---|
| 4,750,136 | 6/1988 | Arpin et al. | 364/514 B |
| 5,033,112 | 7/1991 | Bowling et al. | 359/142 |
| 5,167,024 | 11/1992 | Smith et al. | 395/375 |
| 5,218,704 | 6/1993 | Watts, Jr. et al. | 395/750 |

*Primary Examiner*—John E. Harrity
*Attorney, Agent, or Firm*—Stanford & Bennett, L.L.P

[57] ABSTRACT

A configuration system including a processor having memory for storing operating parameters and configuration logic for retrieving the operating parameters and configuring a computer system to achieve a desired performance level. The configuration logic preferably includes programmable regulators, such as a voltage regulator and a clock synthesizer, for asserting an operating voltage and clock signal, respectively, to the processor. These operating signals are asserted at nominal levels at start up to allow the processor to operate at a reduced, yet adequate performance level. The stored operating parameters are asserted onto a processor data bus by the processor during start up and stored in corresponding data latches. The parameters are further provided to the programmable regulators, such as a voltage regulator, a clock synthesizer, for example, which convert the operating signals from the nominal levels to optimal levels corresponding to the retrieved parameters. The operating signals may further be dynamically reconfigured by storing new parameters in the data latches, if desired. Thus, the regulators may be dynamically reconfigured during operation to achieve operating criterion, such as slowing down the clock frequency during a low power mode.

20 Claims, 3 Drawing Sheets

METHOD AND APPARATUS FOR CONFIGURATION OF PROCESSOR OPERATING PARAMETERS

FIELD OF THE INVENTION

The present invention relates to processor configuration, and more particularly to a configuration system for configuring a processor according to optimal operating parameters.

DESCRIPTION OF THE RELATED ART

A processor for a personal computer (PC) usually requires one or more operating signals to enable operation. Examples of such operating signals include a clock signal for synchronizing digital circuitry and an operating or source voltage for providing power. Although a manufacturer targets certain levels or values for a given processor to achieve desired performance, such levels may vary within specified ranges. However, the performance of the processor may vary within the specified ranges. For high performance devices including processors, there is often a subrange or even a particular optimum operating value for each operating signal to achieve maximum or optimal performance.

In particular, it is known that the performance of a processor varies with corresponding variations of its operating signals. For example, a given processor may function within a frequency range of 25–100 MHz and within an operating voltage range of 4.5 V to 5.5 V. The processor may function at lower performance or nominally at the lower frequencies and voltages, yet perform at an optimal level at a particular voltage and frequency, such as 100 MHz and 5.1 V, as an example. Such optimal values and ranges are usually determined through extensive testing and usually vary from one processor to the next.

The manufacturing process tends to affect the operating parameters within operating ranges at which optimal performance occurs. Yet manufacturers cannot always control the manufacturing process as tightly as desired, resulting in the variations of the actual optimal operating parameters from one chip to the next. The issue of confirming critical support parameters requirements is not reliably accomplished, even at the wafer sort. The packaging operation also causes parameter drift which often cannot be anticipated at an earlier stage of testing. Therefore, the frequency and voltage requirements must be experimentally determined and confirmed after the final packaging stage. In sum, each individual processor must be tested to determine its optimal operating parameters after packaging.

A computer system may include a socket, such as a zero-insertion force (ZIF) socket or the like, for receiving one of several pin-compatible processors, where each processor operates at a different clock speed and at a different source voltage. For example, one particular processor may operate at 5 V and 25 MHz, while another pin-compatible member may operate at 3.3 V and 120 MHz. To allow for these variations, the industry has used board jumpers or the like to handle these configuration variations. For example, a set of jumpers may be provided near the processor socket for configuring the voltage and/or the frequency for a particular processor plugged into the socket. The user must access and change the jumper settings for a processor upgrade. Alternatively, manufacturers such as the Intel Corporation ("Intel"), have used voltage identification (ID) pins to command the configuration of its core voltages. Yet this requires programming four dedicated pins on the integrated circuit (IC) package. Such dedicated ID pins also increase the footprint or number of pins, thereby substantially increasing the cost of the processor and computer system.

It is desired to dynamically reconfigure or otherwise modify the operating parameters to achieve certain results during operation of the processor. For example, a portable computer may have a low power mode, where it is desired to decrease the clock speed to save power.

It is further noted that reconfiguration of system block functions or the system architecture in general has required routines written under program control and decoding from the data bus. This procedure is a slow way to perform such reconfigurations. For example, the cache memory may need reconfiguring for best utilization for a particular processor operation. Thus, there is a need for dynamic reconfiguration of certain system operating parameters to achieve desired results.

A method and apparatus is desired for automatically configuring a processor upon power-up to achieve optimal performance. Such configuration is desired without the necessity of jumpers and/or extra processor voltage ID pins. Furthermore, it is desired to provide a method of dynamically reconfiguring the operating parameters to achieve certain desired results, such as reduced power operation.

SUMMARY OF THE INVENTION

A configuration system according to the present invention includes a processor with memory for permanently storing one or more desired operating parameters. The stored operating parameters correspond to a desired configuration of the processor and/or associated system blocks, such as particular levels of operating signals provided to the processor including a clock frequency, operating voltage, etc. Configuration of the system blocks or other portions of the computer system could include configuration of memory devices, such as the processor's external cache. Configuration logic receives the operating parameters from the processor at power up and reconfigures the processor and/or computer system as desired.

Preferably, the configuration logic includes one or more programmable regulators for providing operating signals at nominal values at power-up to achieve a nominal or a predetermined minimal level of performance. For example, a voltage regulator provides a nominal operating voltage and a clock synthesizer provides a relatively low clock frequency to the processor at startup to allow the processor to function at a reduced performance level with expected reliability for a data transfer. As soon as feasible in the startup routine, the stored operating parameters are provided by the processor across a processor data bus to one or more of the regulators. Each regulator respondingly modifies its output operating signal to correspond with a received operating parameter. The stored parameters are preferably optimal parameters, so that the performance of the processor is correspondingly boosted to its optimal level.

Each regulator of the configuration logic is preferably programmable to allow dynamic reconfiguration during operation. For example, the processor asserts a new frequency and/or voltage parameter to slow it down for certain low power applications or periods of inactivity. Of course, parameters other than clock frequency and source voltage are contemplated, although the clock frequency and source voltage parameters are usually the most important for defining processor performance. Another parameter may concern cache configuration. For example, the external L2 cache may be programmable for best utilization for a particular operation or for a particular processor.

In the preferred embodiment, optimal parameters are functionally derived for the processor during final test when it is manufactured. This data is permanently stored in memory internal to the processor, such as with a programmable read-only memory (PROM) or the like. This data is preferably in the form of digital values which reflect the measured optimal parameters. This PROM storage method could be of any suitable technology which is reliable at the high operating temperatures that the processor silicon is subjected to. In the startup routine, or as soon thereafter as desired, the stored optimal parameters are written onto the processor data bus and retrieved by the regulators. This data is preferably transferred from the data bus in a similar manner as any data is transferred to a memory device connected to the processor. For example, the control pins (MEM/I/O or M/I, R/W, DC, CACHE and KEN for the P6 microprocessor by Intel) are preferably encoded, where decode circuitry asserts enable signals to alert each regulator of the data transfer. This transfer is done to allow correct optimal parameters to be supplied to support the processor as quickly as possible.

It is noted that the stored operating parameters need not be optimal, but may reflect performance and power/efficiency trade-offs. Thus, the stored parameters may be according to any desired performance and/or efficiency standards.

In the preferred embodiment, data latches are coupled to the processor's data bus to retrieve the parameter data from the processor. Decode circuitry coupled to the control pins of the processor is preferably used to enable the data latches to retrieve the desired data. The data latches provide the parameters read from the processor to corresponding regulators, which then update the operating signal levels accordingly. If desired, one or more signals of the processor's address bus could be used for additional decoding.

A programmable clock synthesizer initially provides a clock signal to the processor at a relatively low frequency level at start-up. The stored parameters include an optimal clock frequency parameter, which is provided to the clock synthesizer from the latches soon after power-up. The clock synthesizer retrieves the optimal clock parameter and asserts a corresponding optimal frequency to achieve optimal performance. In a similar manner, a voltage regulator asserts a nominal voltage level to the processor to allow nominal operation. The processor writes a stored voltage parameter to a data latch, which is further provided to a digital-to-analog (D/A) converter. The D/A converter provides a reference voltage to the voltage regulator. The voltage regulator respondingly asserts a new operating voltage at an optimal level corresponding to the voltage parameter provided from the processor.

It is appreciated that a method and apparatus according to the present invention provides a way to automatically configure the operating parameters provided to a processor or other electronic device without having to provide jumper boards and/or voltage ID pins. Furthermore, the operating parameters are dynamically reconfigurable for particular purposes, such as low power mode or reconfiguration of the cache memory for best utilization of a processing operation. Of course, any particular operating parameter is contemplated.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
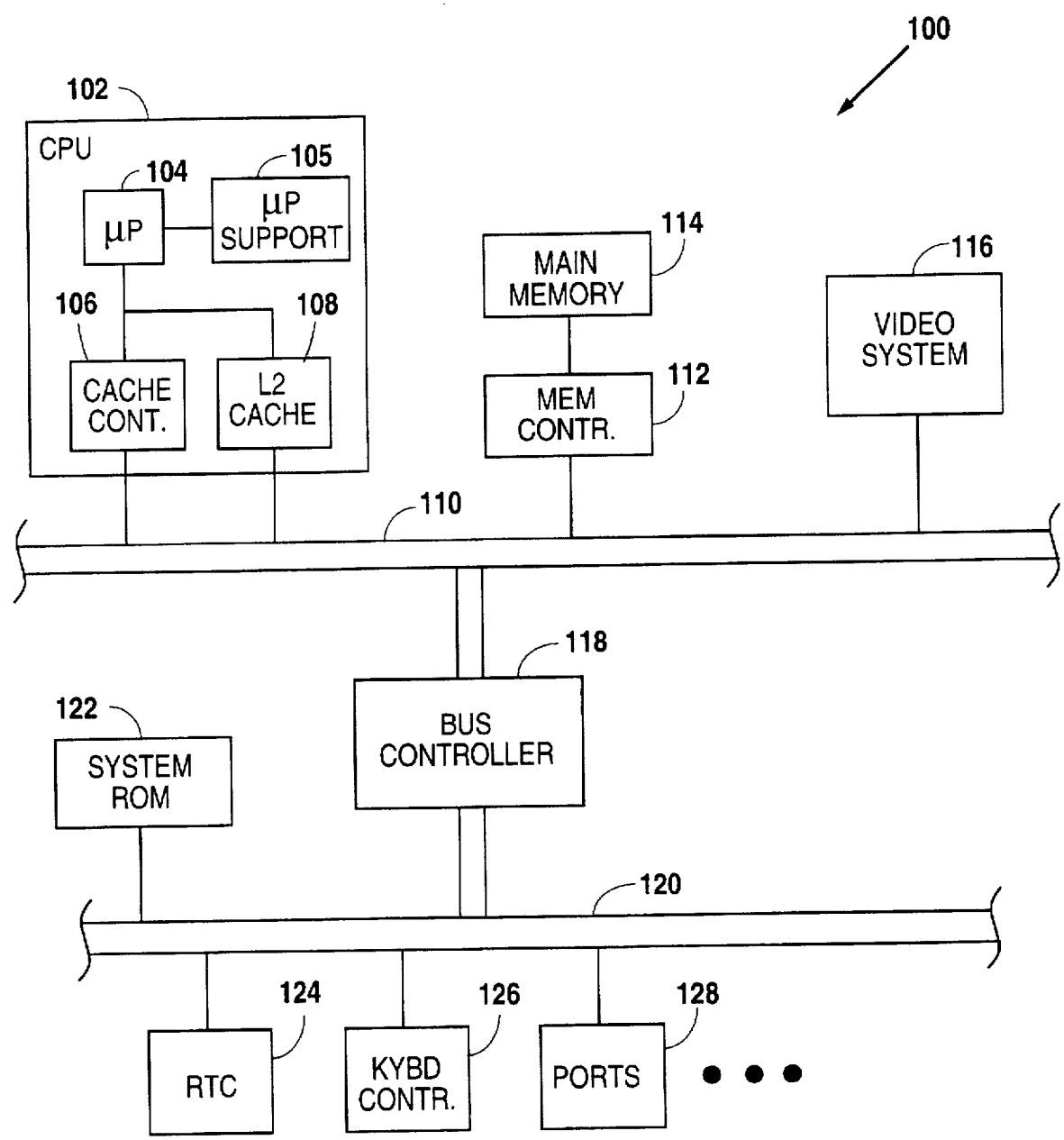
FIG. 1 is a simplified block diagram of a computer system incorporating a configuration system according to the present invention.

Referring now to FIG. 1, a simplified block diagram is shown of a typical personal computer (PC) system 100, which includes a configuration system according to the present invention. The PC 100 is preferably an IBM XT, AT or the like, although other types of computer systems are contemplated. A central processing unit (CPU) 102 includes a microprocessor 104, such as an i486, Pentium, P6, etc. processor by Intel, coupled to support circuitry 105, a cache controller 106 and a level 2 (L2) cache memory 108. The support circuitry 105 preferably includes one or more regulators for providing operating signals to enable the microprocessor 104 to operate, as described further below. The CPU 102 is connected to a host bus 110, which is further coupled to a memory controller 112 and a video system 116. The memory controller 112 is connected to control a main memory 114 preferably comprising dynamic random access memory (DRAM) or the like.

A bus controller 118 is coupled between the host bus 110 and an expansion bus 120, which is further coupled to a system read only memory (ROM) 122, a real time clock (RTC) 124, a keyboard controller 126, a plurality of ports 128 and any other component or port as known to those skilled in the art. The system ROM 122 generally includes start up routines, such as the Basic Input/Output System (BIOS) for controlling basic I/O operations for the PC 100. The L2 cache 108 and the main memory 114 receive program and routine instructions for execution by the microprocessor 104 during operation as known to those skilled in the art. It is common for the microprocessor 104 to be plugged into a socket for receiving one of a plurality of pin-compatible microprocessors for purposes of initial configuration and future upgrades. The present invention concerns configuration of the microprocessor 104. However, configuration of other system components and devices of the PC 100, such as the cache controller 106 and/or the L2 cache 108, is contemplated.

Figure 2:
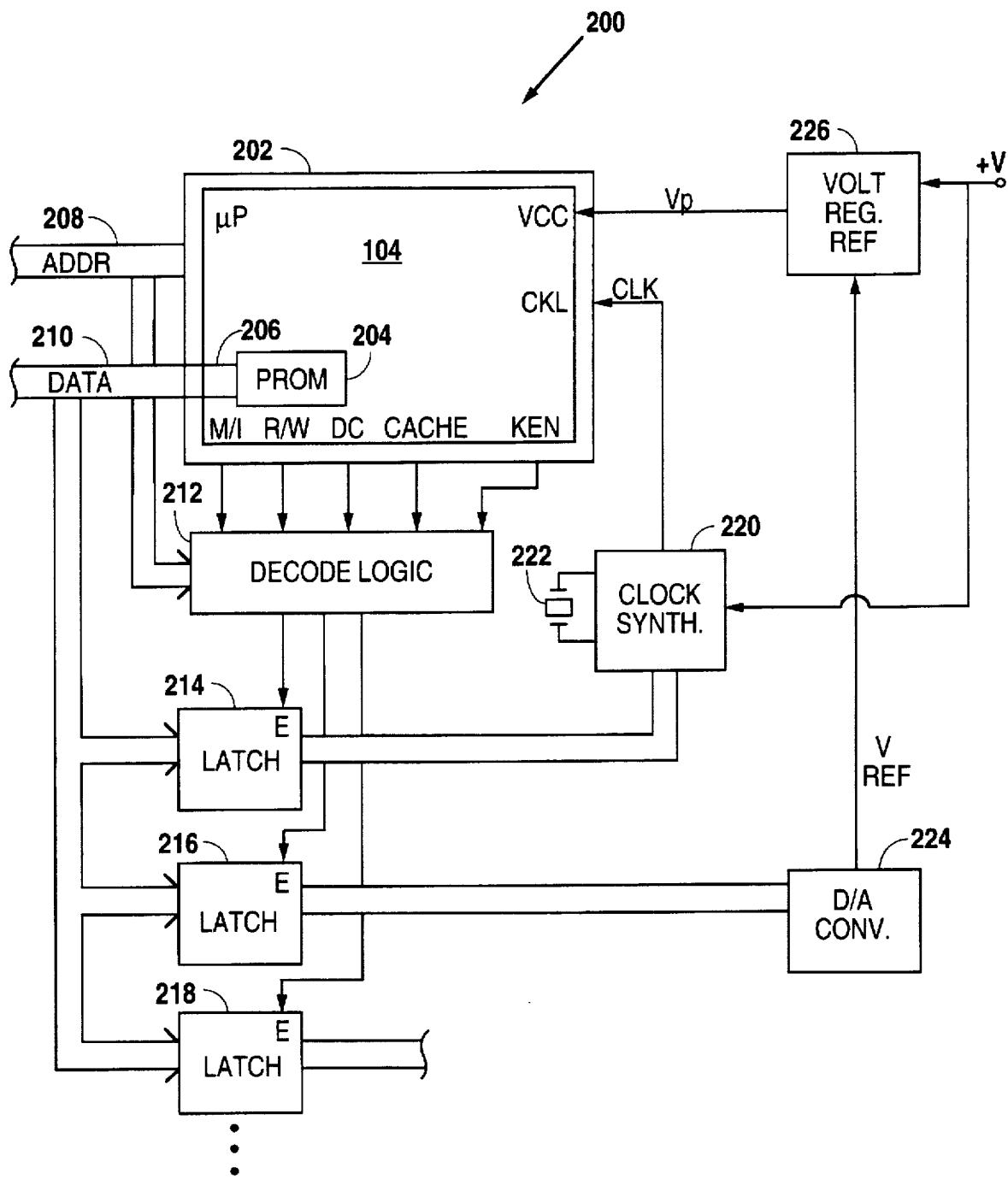
FIG. 2 is a block diagram of a configuration system according to the present invention.

Referring now to FIG. 2, a configuration system 200 according to the present invention is shown for configuring the microprocessor 104 and other system components of the PC 100, as desired. The microprocessor 104 is preferably plugged into a zero insertion force (ZIF) socket 202 for receiving one of several, similar, pin-compatible microprocessors as known to those skilled in the art. The microprocessor 104 further includes a programmable read-only memory (PROM) 204, which could be implemented by any suitable technology reliable at the high operating temperatures that the silicon of the microprocessor 104 is subjected to.

An address bus 208 and a data bus 210 are coupled to the socket 204 for coupling to the address and data pins of the microprocessor 104. The PROM 204 is internally coupled to a data port 206 further coupled to the data pins of the microprocessor 104, so that the PROM 204 is capable of asserting data on the data bus 210. Decode logic 212 is connected to the control pins of the microprocessor 104. For the P6 microprocessor by Intel, these control pins include the memory-I/O (M/I), the read/write (R/W), the DC, CACHE and the KEN pins. Also, the decode logic 212 may optionally be connected to one or more signals of the address bus 208, if further decoding is desired. The decode logic 212 asserts enable signals to several data latches 214, 216, 218, etc., where each of the data latches 214–218 are further coupled to receive data from the data bus 210. The data latch 214 provides data to a programmable clock synthesizer 220 which provides a master clock signal, referred to as CLK, to the microprocessor 104. The clock synthesizer 220 preferably includes a crystal 222 connected to the clock synthesizer 220. The data latch 216 provides data to a digital to analog (D/A) converter 224, which provides an analog signal $V_{REF}$ to the reference input of a voltage regulator 226. The voltage regulator 226 receives a system source voltage from the PC, referred to as +V, for providing a desired processor voltage, referred to as $V_p$, to the VCC input of the microprocessor 104. The PC provides the +V signal from a power supply (not shown) for providing operating voltage to the voltage regulator 226, the clock synthesizer 222, as well as other components and devices of the PC as necessary.

The data latch latches 214–218 may include a plurality of latches or flip-flops, such as D type flip-flops or the like, for storing individual bits of the parameter data from the PROM 204 within the microprocessor 104. The data latch latches 214–218 preferably receive and provide these parameters to configuration logic, which includes corresponding regulators or other components for configuration purposes. For example, a frequency parameter is latched by the data latch 214 and provided to the clock synthesizer 220 for determining the frequency of the CLK signal. A voltage parameter is latched by the data latch 216 and provided to the D/A converter 224 for determining the voltage of the $V_P$ signal provided to the microprocessor 104. Other operating parameters may be defined, as illustrated by the data latch 218, for configuring other operating signals and parameters of the microprocessor 104 as well as other components of the PC 100. For example, the data latch 218 may be connected to provide a configuration parameter for reconfiguring the L2 cache 108 for a particular operation or for a particular microprocessor plugged into the socket 202. The x and y parameters of the L2 cache 108, or any other memory associated with the microprocessor 104, can be configured in this manner. More data latches may be provided as necessary depending upon the number of operating parameters desired.

Figure 3:
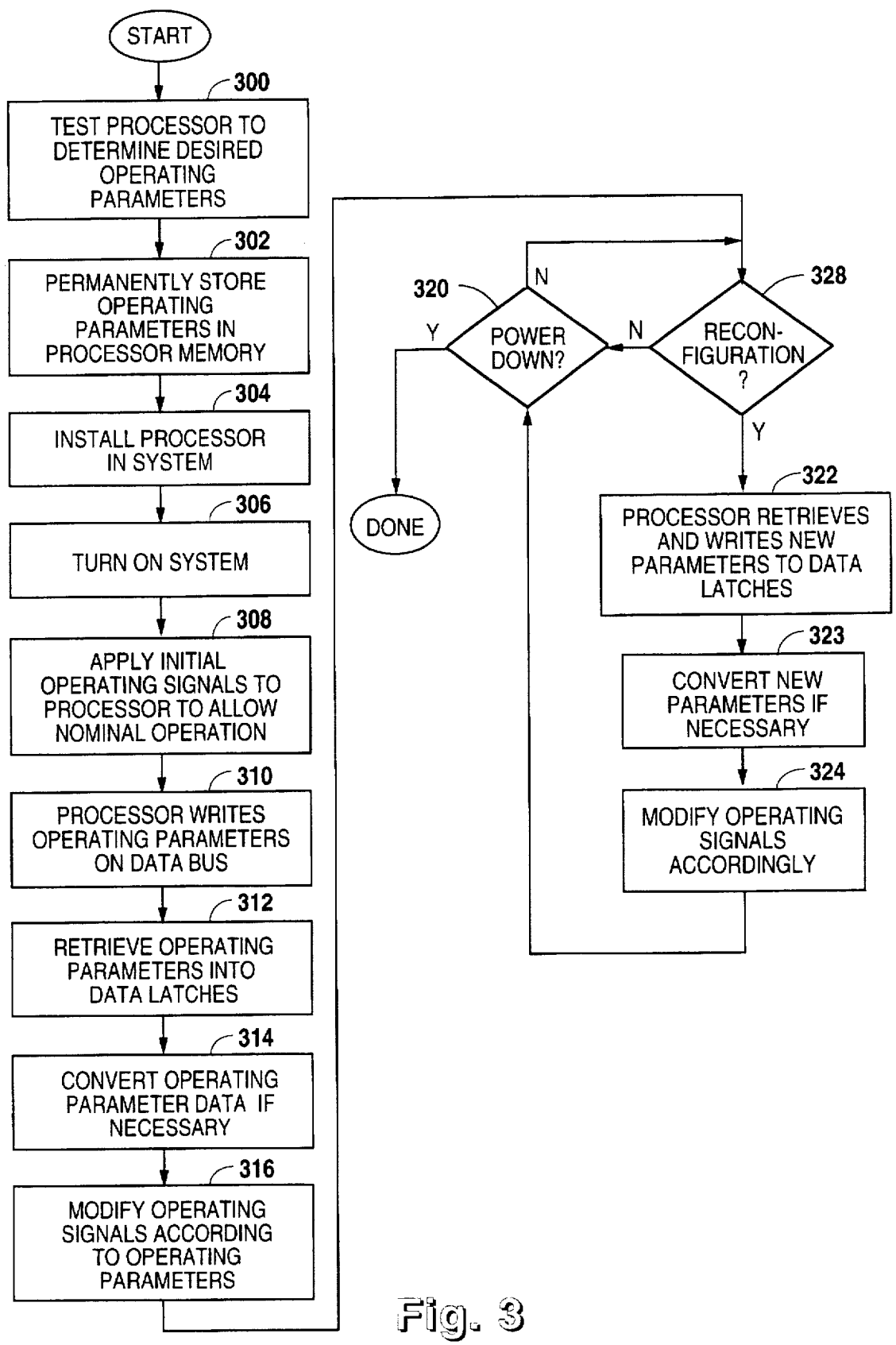
FIG. 3 is a flowchart diagram illustrating a method according to the present invention.

Operation of the configuration system 200 shown in FIG. 2 is now described with reference to a flowchart diagram shown in FIG. 3. In step 300 during final test after manufacture and packaging of the microprocessor 104, certain operating parameters corresponding to specific levels of the operating signals necessary to operate the microprocessor 104 at a desired performance level are measured or otherwise determined. Such parameters typically include clock frequency, operating voltage and any other parameter desired for configuring the microprocessor 104. These parameters are preferably optimal parameters, but may also be derived according to any desired standard, such as optimal efficiency, or according to any other criterion desired by the manufacturer of the microprocessor 104 and/or the PC. Although the following discussion references clock speed and source voltage, it is understood that other parameters are contemplated for configuring other system devices and components of the PC 100, such as parameters for configuring memory devices such as the external L2 cache 108.

After the operational parameters are derived, these parameters are permanently stored in the PROM 204 within the microprocessor 104 in step 302. The PROM storage method could be any suitable technology as known to those skilled in the art. In this manner, the microprocessor 104 is shipped with the parameters stored within its internal PROM 204.

In step 304, the microprocessor 104 is installed into the socket 202 of the PC, and the PC is turned on in step 306. The power supply (not shown) of the PC 100 eventually achieves regulation and asserts the +V signal for providing power to the various components of the PC, including the voltage regulator 226 and the clock synthesizer 220. The voltage regulator 226 is configured to provide the $V_P$ signal at a nominal level as indicated in step 308 to allow the microprocessor 104 to function at least a reduced performance level with expected reliability for data transfer. Alternatively, the latch 216 and the D/A converter 224 are initially configured to provide a nominal level on the $V_{REF}$ signal, where the voltage regulator 226 asserts the $V_P$ signal at its nominal level to allow the microprocessor 104 to power up.

In a similar manner, the clock synthesizer 220 generates the CLK signal at a relatively low or nominal frequency, again to allow a reduced performance level of the microprocessor 104. In this manner, the microprocessor 104 powers up and operates at a nominal functional level for at least providing data transfer from the PROM 204. During power-up, a startup routine is executed by the microprocessor 104, which is preferably provided in the system ROM 122 or the main memory 114 of the PC 100, or in any other memory connected to the microprocessor 104.

One of the first functions of the startup routine, as indicated in step 310, is to cause the microprocessor 104 to write the parameter data from the PROM 204 onto the data bus 210. The microprocessor 104 further asserts its control signals to the decode logic 212 to enable one or more of the latches 214–218 for receiving the parameters, as indicated in step 312. Depending upon the size of the parameter data, the size of the latches 214–218 and the data bus 210, this write operation may be performed with a single write or with multiple writes, as necessary, to write the data into the latches 214–218 For example, if the data bus 210 is 32 bits and each of the latches 214–218 are 8 bits wide for storing 8-bit parametric data, then only a single write operation is necessary for three 8-bit latches. However, if each of the latches 214–218 are 16 bits in length for storing 16-bit parametric data, then two write operations across the data bus 210 are necessary to store the data within the latches 214–218 for three 16-bit latches. In any event, the parametric data stored within the PROM 204 is written into the latches 214–218 soon after startup of the microprocessor 104, as indicated in step 312.

The parameter stored in the latch 214 preferably corresponds to a desired clock frequency for the microprocessor 104. This data from latch 214 is provided to the clock synthesizer 220, which converts the clock parameter dam, as indicated in step 314, into an optimal frequency for the CLK signal, which is thus provided to the microprocessor 104, as indicated in step 316. Thus, the clock synthesizer 222 modifies the CLK operating signal according to the clock parameter stored in the latch 214. Preferably, the CLK signal is set to the necessary level for achieving optimal performance of the microprocessor 104 as desired. In a similar manner, voltage parameter data stored in latch 216 is provided to the D/A converter 224, which converts the voltage parameter to a new level of the $V_{REF}$ signal provided to the voltage regulator 226 in step 314. The voltage regulator 226 correspondingly modifies its $V_p$ signal to an optimal level as indicated in step 316. In this manner, the microprocessor 104 is provided with an optimal operating voltage at its VCC input, as well as an optimal CLK frequency at its clock input. Thus, the microprocessor 104 begins operating at an optimal level as predetermined during the test step 300 after the microprocessor was manufactured.

Of course, operating or configuration parameters other than voltage and frequency can also be determined and stored in the PROM 204 and written to latches, such as the latch 218, for configuring any of the PC systems, or the microprocessor 104, as desired. An example of another configuration parameter is a value for reconfiguring the external cache memory or of the L2 cache 108, for best utilization of a processing operation performed by the microprocessor 104.

During operation of the PC and microprocessor 104, it may be desired to dynamically reconfigure the operating parameters stored in the latches 214–218, according to new functional specifications. For example, it may be desired to run the PC in low power mode by reducing the frequency of the CLK signal. If such dynamic reconfiguration as indicated in step 318 is not desired, the microprocessor 104 runs at its optimal level and is eventually powered down in step 320. However, if reconfiguration is desired in step 318, then a software routine executed by the microprocessor 104 causes it to write new data to the latches 214, 216 or 218 as desired as indicated in step 322. In particular, a program or software routine causes the microprocessor 104 to assert the M/I, R/W, DC, cache and KEN signals, along with a particular address on the address bus 108, so that the decode logic 212 enables one or more of the latches 214–218, for writing new parameter data. It is noted that this new data is provided from any accessible memory location, such as the microprocessor 104, the main memory 114 for the PC, etc.

Once the new data is written to the latches 214–218, this data is provided to corresponding regulators, such as the clock synthesizer 220 or the voltage regulator 226, which further modify their respective operating signals as indicated in step 324. In this manner, the functionality and relative performance of the microprocessor 104 is dynamically modified according to the new parametric data. Reconfiguration is performed as often as desired while the PC is powered on, until the system is powered off in step 320 and operation is completed.

It is now appreciated that a configuration system according to the present invention provides an automatic way to configure a processor and/or computer system to operate at desired performance levels without having to provide separate jumpers or voltage ID pins, etc. on the processor. The operating parameters are determined during manufacture and permanently stored in an internal memory of the processor during test. The processor is then installed within a PC according to the present invention, which includes configuration logic for configuring the processor and/or computer system. Preferably, the configuration logic includes one or more programmable regulators for asserting operating signals to allow nominal operation of the processor. The regulators are programmable and provide variable levels of the operating signals to achieve varied performance of the processor. During the startup routines of the processor, the optimal parameter data is written out on the data bus and provided to the regulators, which correspondingly update the levels of the operating signals to optimal levels according to the stored data within the processor.

In the preferred embodiment, the data is written into respective latches which further provide the data to the programmable regulators, such as a voltage regulator or clock synthesizer, which in turn updates the operating voltage and master clock signal to the processor to achieve the desired optimal performance.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A configuration system that optimizes operation of a processor of a computer system, comprising:

a processor including internal memory that permanently stores at least one operating parameter associated with a predetermined optimal operation of said processor and that externally provides said at least one operating parameter upon power-up of said processor; and configuration logic coupled to said processor that provides operating signals enabling power-up and functional operation of said processor, that receives said at least one operating parameter and that modifies at least one operating signal according to said at least one operating parameter to achieve said predetermined optimal operation of said processor.

2. The configuration system of claim 1, further comprising:

said configuration logic including at least one programmable regulator that asserts said at least one operating signal at an initial value upon power-up of the computer system to enable nominal operation of said processor and that modifies said at least one operating signal to said particular value corresponding to said operating parameter.

3. The configuration system of claim 2, wherein said at least one operating signal is a clock signal and said at least one operating parameter is a frequency parameter corresponding to a predetermined frequency.

4. The configuration system of claim 3, wherein said programmable regulator comprises:

a programmable clock synthesizer that asserts said clock signal at a nominal frequency upon power-up and that asserts said clock signal at said predetermined frequency after receiving said frequency parameter.

5. The configuration system of claim 4, further comprising:

a latch coupled to said processor and said clock synthesizer that receives and latches said frequency parameter and that provides said latched frequency parameter to said clock synthesizer.

6. The configuration system of claim 3, wherein said predetermined frequency enables said processor to operate at an optimal performance level.

7. The configuration system of claim 2, wherein said at least one operating signal is a voltage signal and said at least one operating parameter is a voltage parameter corresponding to a predetermined voltage level.

8. The configuration system of claim 7, wherein said programmable regulator comprises:

a programmable voltage regulator that asserts said voltage signal at a nominal level upon power-up and that asserts said voltage signal at said predetermined voltage level after receiving said voltage parameter.

9. The configuration system of claim 8, wherein said voltage parameter is a digital value, said voltage regulator further comprising:

a digital to analog converter coupled to receive said voltage parameter and to provide a corresponding reference signal corresponding to the level of said voltage signal; and a latch coupled to said processor and said converter that receives and latches said voltage parameter.

10. The configuration system of claim 7, wherein said predetermined voltage level enables said processor to operate at an optimal performance level.

11. The configuration system of claim 2, further comprising:

said processor internal memory storing a plurality of operating parameters including a frequency parameter and a voltage parameter, and said processor receiving a plurality of operating signals including a clock signal and a voltage signal; and said configuration logic including a clock synthesizer that asserts a clock signal to said processor at a nominal frequency upon power-up and changes said clock signal to a predetermined frequency after receiving said frequency parameter and a voltage regulator that asserts a voltage signal to said processor at a nominal voltage level upon power-up and changes said voltage signal to a predetermined voltage level after receiving said voltage parameter.

12. The configuration system of claim 11, wherein said predetermined frequency and said predetermined voltage level enable said processor to operate at an optimal performance level.

13. A computer system that optimizes operation of its processor, comprising:

a data bus;

a processor coupled to said data bus, comprising:
 a data port coupled to said data bus; and
 memory coupled to said data port that permanently stores at least one operating parameter associated with a predetermined optimal operation of said processor and that asserts said at least one operating parameter onto said data bus via said data port upon power-up of said processor; and a configuration system coupled to said data bus that provides operating signals enabling power-up and functional operation of said processor, that receives said operating parameter and that modifies at least one of said operating signals according to said at least one operating parameter to achieve said predetermined optimal operation of said processor.

14. The computer system of claim 13, further comprising:

said processor memory storing a plurality of operating parameters including a frequency parameter and a voltage parameter, and said processor receiving a plurality of operating signals including a clock signal and a voltage signal;

said configuration system including a clock synthesizer that asserts said clock signal and a voltage regulator that asserts said voltage signal;

wherein said clock synthesizer asserts said clock signal at a nominal frequency upon power-up and changes said clock signal to a predetermined frequency after receiving said frequency parameter; and wherein said voltage regulator asserts said voltage signal at a nominal voltage level upon power-up and changes said voltage signal to a predetermined voltage level after receiving said voltage parameter.

15. The computer system of claim 14, wherein said predetermined frequency and said predetermined voltage level enable said processor to operate at an optimal performance level.

16. The computer system of claim 14, further comprising:

a plurality of data latches coupled to said data bus and said configuration system that receive and latch said plurality of operating parameters; and decode logic coupled to said processor that enables said plurality of data latches.

17. The computer system of claim 16, wherein said processor asserts address and control signals to said decode logic to enable one or more of said data latches.

18. A method of configuring a processor, comprising the steps of:

determining optimal operating parameters of the processor;

permanently storing the optimal operating parameters in the processor;

providing the processor with operating signals enabling power-up and functional operation;

the processor providing the optimal operating parameters to an external bus during power-up; and changing the value of the operating signals to correspond to the optimal operating parameters.

19. The method of claim 18, further comprising the step of:

during operation of the processor, dynamically reconfiguring at least one of the operating signals according to another operating parameter different from the optimum operating parameter.

20. The method of claim 18, wherein the operating signals include a clock signal and a source voltage signal and wherein the operating parameters include an optimal frequency level of the clock signal and an optimal voltage level of the source voltage signal.

* * * * *